United States Patent
Hargrove

(10) Patent No.: US 11,318,594 B2
(45) Date of Patent: May 3, 2022

(54) SYSTEMS AND/OR DEVICES FOR MANAGING VEHICLE REPAIRS

(71) Applicant: Monroe Hargrove, White Bluff, TN (US)

(72) Inventor: Monroe Hargrove, White Bluff, TN (US)

(*) Notice: Subject to any disclaimer, the term of this patent is extended or adjusted under 35 U.S.C. 154(b) by 353 days.

(21) Appl. No.: 16/481,568

(22) PCT Filed: Apr. 30, 2017

(86) PCT No.: PCT/US2017/030319
§ 371 (c)(1),
(2) Date: Jul. 29, 2019

(87) PCT Pub. No.: WO2018/140070
PCT Pub. Date: Aug. 2, 2018

(65) Prior Publication Data
US 2019/0389040 A1 Dec. 26, 2019

Related U.S. Application Data

(63) Continuation of application No. 15/418,762, filed on Jan. 29, 2017, now abandoned.

(51) Int. Cl.
*B25B 27/00* (2006.01)
*B25B 27/02* (2006.01)
*B62D 65/12* (2006.01)

(52) U.S. Cl.
CPC ........ *B25B 27/0035* (2013.01); *B25B 27/026* (2013.01); *B60G 2204/416* (2013.01);
(Continued)

(58) Field of Classification Search
CPC ... B25B 27/0035; B25B 27/026; B25B 5/101; B25B 27/023; B25B 27/062; B25B 5/163; B25B 27/06; B25B 27/064; B25B 1/103; B25B 27/02; B60G 2206/91; B60G 2204/416; B60G 2206/50; B60G 2206/92;
(Continued)

(56) References Cited

U.S. PATENT DOCUMENTS 1,863,956 A * 6/1932 Wilson .................... B25B 27/06
29/275
4,624,039 A * 11/1986 Lawrence ............. B25B 27/023
29/257
(Continued)

FOREIGN PATENT DOCUMENTS

EP 1743744 * 7/2006
FR 1211991 * 12/1958

OTHER PUBLICATIONS

SPX Corporation Ball-Joint serviceset Manual(Rev.B) (Year: 2006).*

*Primary Examiner* — Mahdi H Nejad
(74) *Attorney, Agent, or Firm* — Dale Jensen, PLC; Dale Jensen

(57) ABSTRACT

Certain exemplary embodiments can provide a system comprising a frame, which can comprise a backbone, which defines a backbone longitudinal axis. The frame can further comprise a handle coupled to the backbone. The handle is positioned to allow a user to lift and position the frame. An actuator is coupled to the backbone. The actuator defines an actuator longitudinal axis.

13 Claims, 19 Drawing Sheets

(52) U.S. Cl.
CPC ...... *B60G 2206/50* (2013.01); *B60G 2206/91* (2013.01); *B60G 2206/92* (2013.01); *B62D 65/12* (2013.01); *F16C 2226/12* (2013.01); *F16D 2250/0084* (2013.01)

(58) Field of Classification Search
CPC ................. B62D 65/12; F16C 2226/12; F16D 2250/0084; Y10T 29/53826; Y10T 29/49822; Y10T 29/53843
USPC .............. 29/257, 426.5, 251; 269/249, 143; 100/231
See application file for complete search history.

(56) References Cited

U.S. PATENT DOCUMENTS

| | | | | |
|---|---|---|---|---|
| 5,586,378 | A * | 12/1996 | Smith | B25B 27/023 269/249 |
| 5,713,117 | A * | 2/1998 | Bliss | B25B 27/023 29/257 |
| 5,857,252 | A * | 1/1999 | Jansen | B25B 27/062 29/257 |
| 7,387,296 | B2 * | 6/2008 | Alberti | B25B 5/067 269/143 |
| 7,610,664 | B2 * | 11/2009 | Wridt | B25B 27/062 269/143 |
| 8,689,420 | B2 * | 4/2014 | Barrios | B25B 27/023 29/257 |
| 9,751,199 | B2 * | 9/2017 | Andrews | B25B 27/04 |
| 9,902,033 | B1 * | 2/2018 | Taylor | B25B 1/24 |
| 9,908,208 | B2 * | 3/2018 | Andrews | B23P 19/04 |
| 2007/0262506 | A1 * | 11/2007 | Alberti | B25B 5/163 269/249 |
| 2008/0048375 | A1 * | 2/2008 | Rolfe | B25B 5/101 269/249 |
| 2013/0082429 | A1 * | 4/2013 | Kiviniemi | B23P 13/00 269/286 |
| 2014/0369775 | A1 * | 12/2014 | Lai | B23B 51/0473 408/209 |
| 2016/0325341 | A1 * | 11/2016 | Gostylla | B21J 15/025 |
| 2017/0190034 | A1 * | 7/2017 | Blackford | B25H 1/0014 |

* cited by examiner

18000

SYSTEMS AND/OR DEVICES FOR MANAGING VEHICLE REPAIRS

CROSS-REFERENCES TO RELATED APPLICATIONS

This application claims priority to, and incorporates by reference herein in its entirety, pending U.S. patent application Ser. No. 15/418,762.

BRIEF DESCRIPTION OF THE DRAWINGS

A wide variety of potential practical and useful embodiments will be more readily understood through the following detailed description of certain exemplary embodiments, with reference to the accompanying exemplary drawings in which.

DETAILED DESCRIPTION

Certain exemplary embodiments provide a device and/or system that allow someone performing mechanical repairs to disassemble and/or assemble certain vehicle components. For example, parts coupled to ball joints, bushings, and/or bearings can be difficult to separate and/or couple together. Often, such parts are very close in dimensions and are "press fit" together. In addition, over time the parts can seize together. Certain exemplary embodiments provide a device and/or system that allows someone performing mechanical repairs to separate and/or reassemble vehicle parts with relative ease. The embodiments disclosed herein can separate and/or press together any close tolerance parts. The embodiments disclosed can handle any and all sizes of ball joints, bushings, bearings, universal joints, and/or any other parts. Sizes of various disclosed components can vary, but can range between approximately ¼ inch in diameter and approximately 5 inches in diameter. Thereby, the embodiments disclosed can assist in repairs of light equipment, motor vehicles, heavy equipment, farm equipment, mining equipment, construction equipment, and/or semi trucks, etc.

Figure 1:
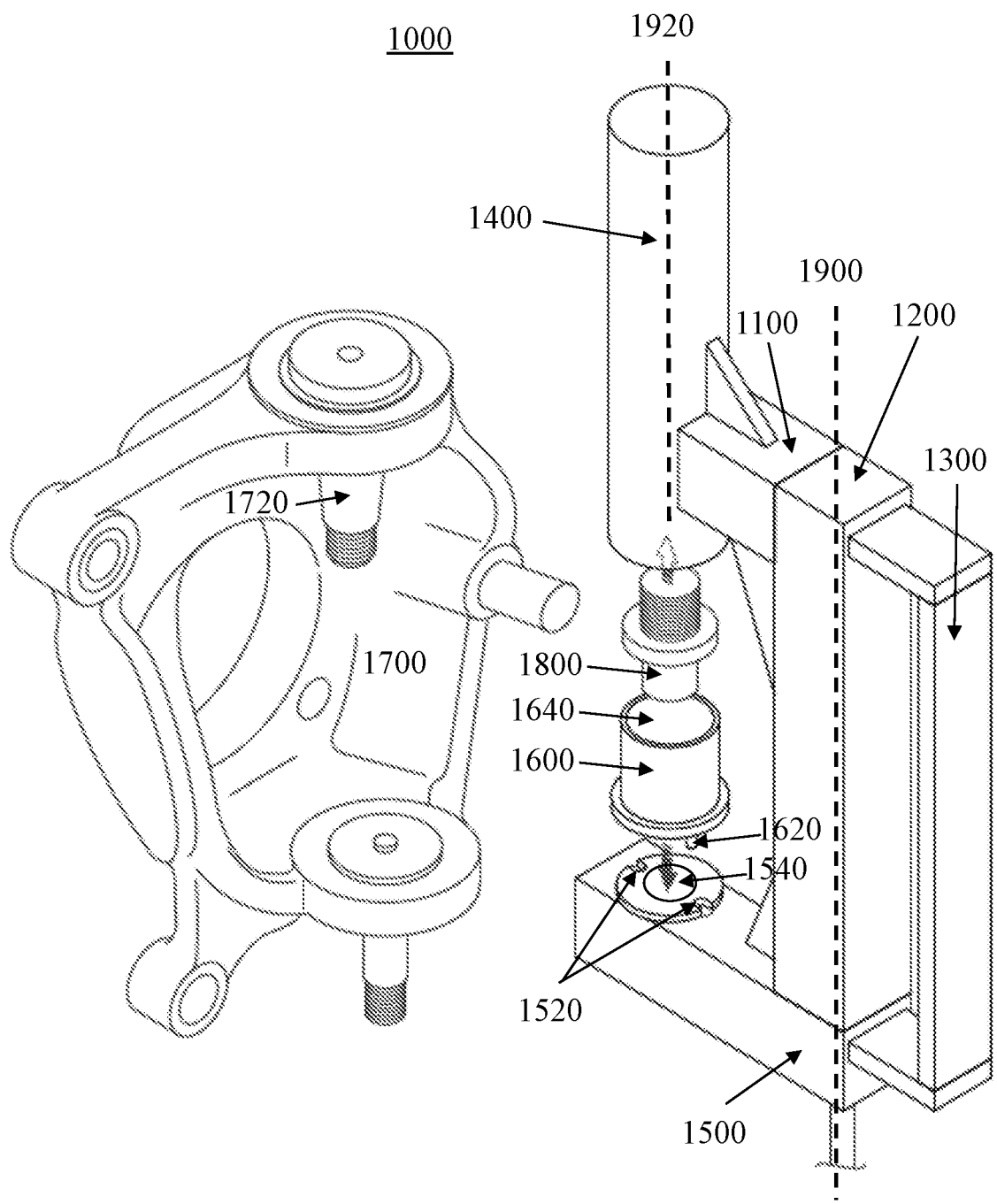
FIG. 1 is a perspective view of an exemplary embodiment of a system 1000.

FIG. 1 is a perspective view of an exemplary embodiment of a system 1000, which comprises a frame 1100. System 1000 comprises a backbone 1200, which defines a backbone longitudinal axis 1900. Backbone 1200 can be a hollow member. Frame 1100 further comprises a handle 1300 coupled to backbone 1200. Backbone 1200 can be fixedly coupled to handle 1300. Handle 1300 is positioned to allow a user to lift and position frame 1100. An actuator 1400 is coupled to backbone 1200. Actuator 1400 defines an actuator longitudinal axis 1920. Actuator longitudinal axis 1920 is substantially parallel to the backbone longitudinal axis 1900. Actuator 1400 can comprise a hydraulic cylinder. Actuator 1400 can be a porta power hydraulic jack coupled to system 1000. A base 1500 is coupled to backbone 1200. Base 1500 defines a plurality of attachment apertures 1520. Base 1500 defines a vehicle part aperture 1540. Frame 1100 is positionable on a vehicle component 1700 such that a portion of the vehicle component 1700 is positioned between actuator 1400 and base 1500. System 1000 comprises an adapter 1800, which is releasably coupled to actuator 1400 and provides a pressing surface.

Actuator 1400 constructed to apply pressure to vehicle component 1700 to remove or install a vehicle part 1720. Vehicle part 1720 can be a ball joint as illustrated, and actuator 1400 presses the ball joint loose from vehicle component 1700. In certain exemplary embodiments, actuator 1400 can presses the ball joint into vehicle component 1700. When engaged, a portion of vehicle part 1720 can be received by vehicle part aperture 1540.

In exemplary applications of system 1000, vehicle part 1720 can be a bushing that is pressed in or out of vehicle component 1700. In other applications, vehicle part 1720 can be a bearing that is pressed in or out of vehicle component 1700. In other applications, vehicle part 1720 can be a universal joint and actuator 1400 presses a portion of the universal joint in or out of vehicle component 1700.

In certain exemplary applications, actuator 1400 is mounted above vehicle part 1720 and applies downward pressure to vehicle part 1720. In other applications, actuator 1400 is mounted above vehicle part 1720 and causes upward pressure to be applied to vehicle part 1720.

System 1000 comprises an attachment 1600 releasably coupleable to base 1500. Attachment 1600 comprises a plurality of prongs 1620. Each of plurality of prongs 1620 spaced to engage with a corresponding aperture of plurality of attachment apertures 1520 defined by base 1500. Attachment 1600 provides an attachment aperture 1640 that facilitates application of pressure to vehicle part 1720.

Attachment 1600 is releasably coupleable to base 1500. Attachment 1600 defines attachment aperture 1640 such that vehicle part 1720 is received by vehicle part aperture 1540. Attachment 1600, when used in conjunction with adapter 1800, when engaged with system 1000 causes a downward pressure be applied to vehicle part 1720 as a shaft of the actuator travels in a downward direction.

Figure 2:
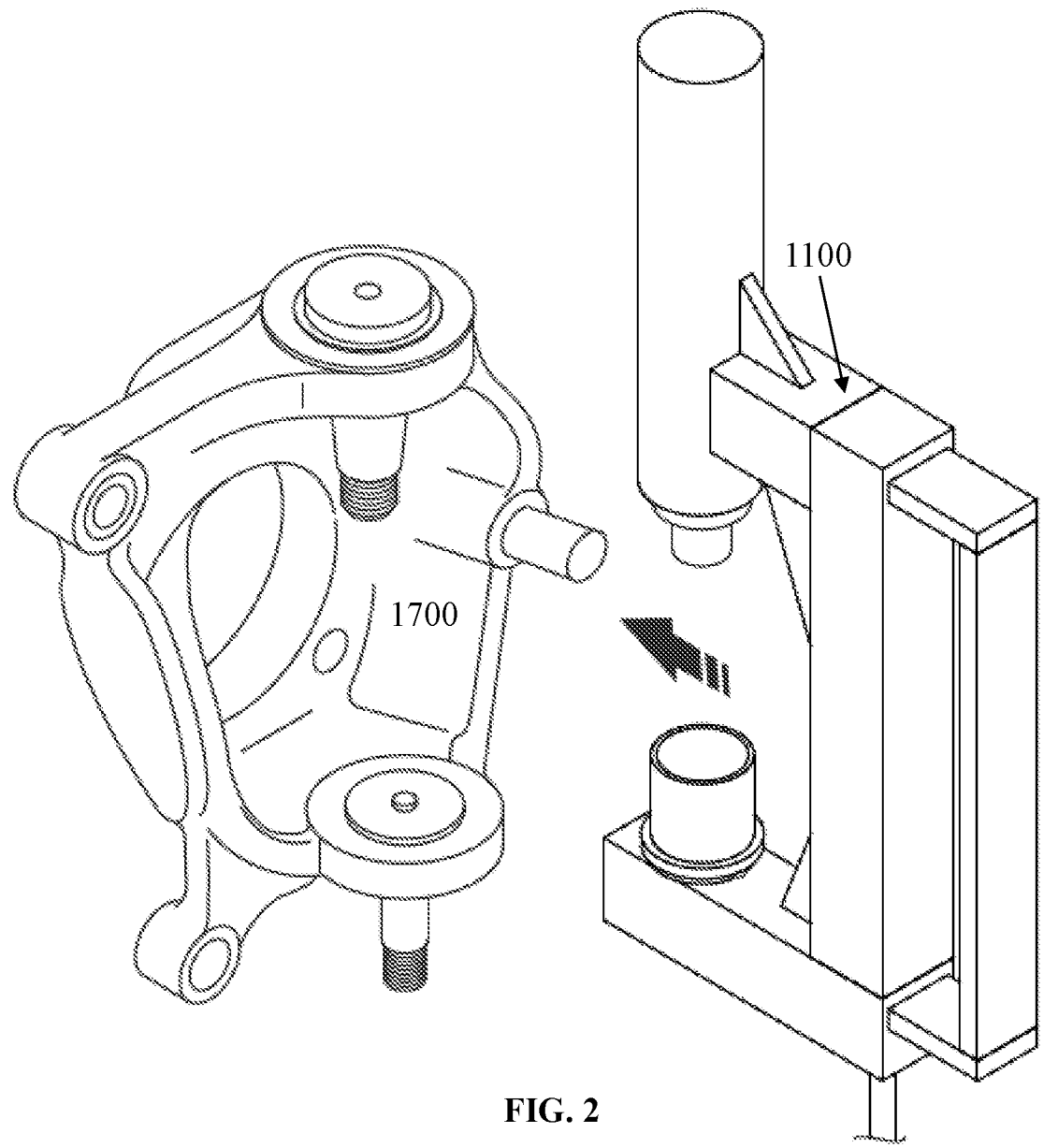
FIG. 2 is a perspective view of an exemplary embodiment of system 1000.

FIG. 2 is a perspective view of an exemplary embodiment of system 1000 as frame 1100 is move toward vehicle component 1700.

Figure 3:
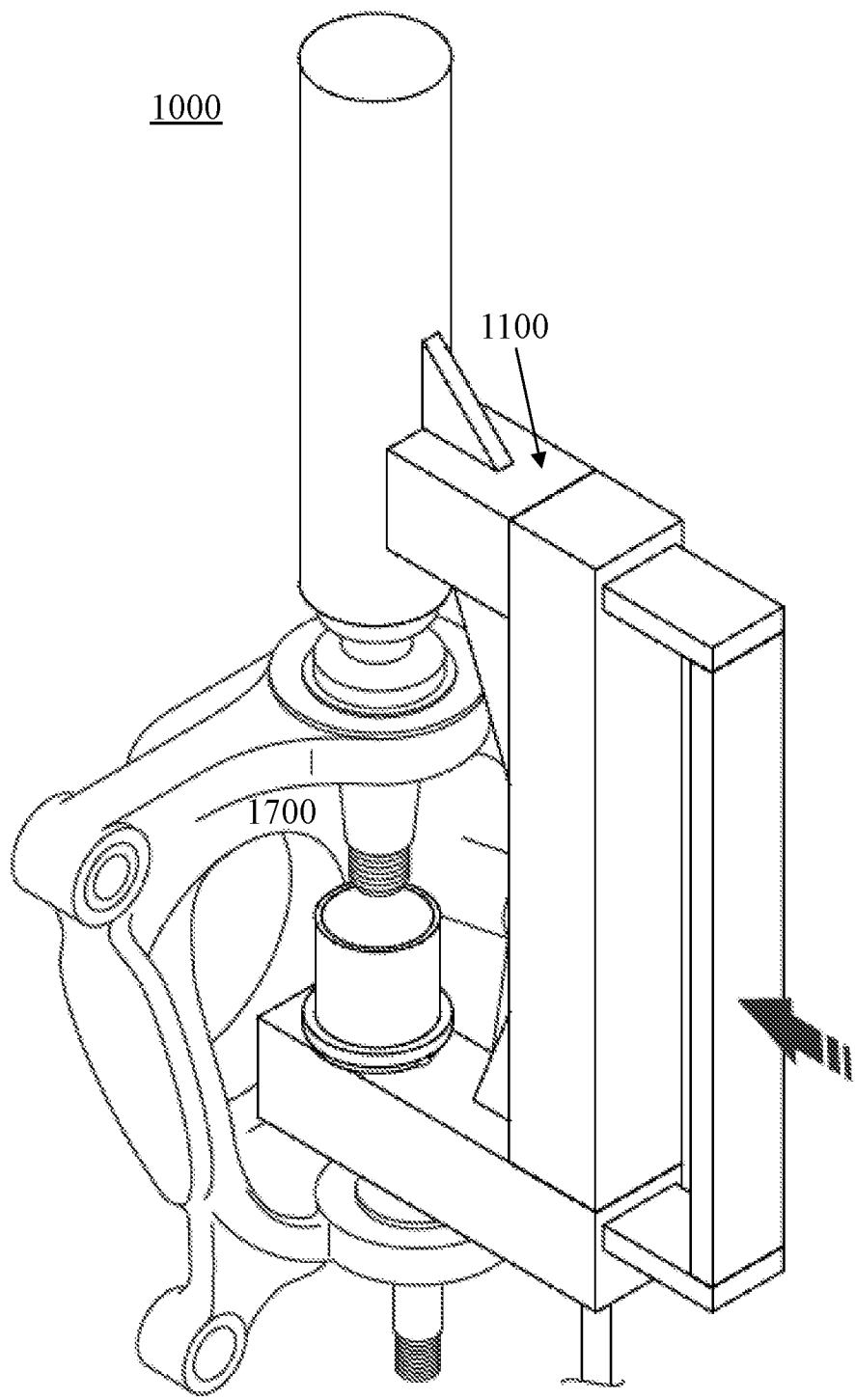
FIG. 3 is a perspective view of an exemplary embodiment of system 1000.

FIG. 3 is a perspective view of an exemplary embodiment of system 1000 as frame 1100 is moved in a position to engage with vehicle component 1700.

Figure 4:
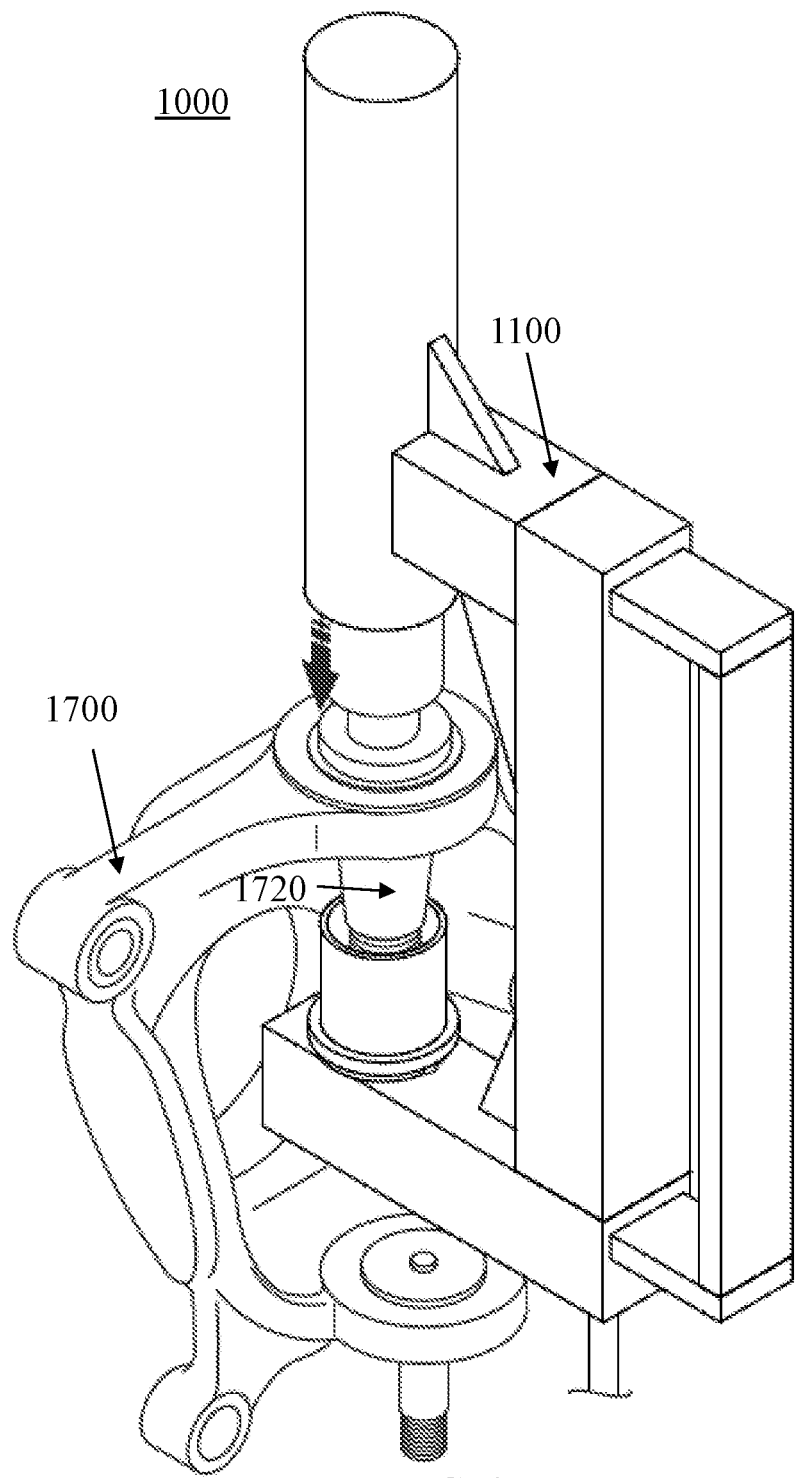
FIG. 4 is a perspective view of an exemplary embodiment of system 1000.

FIG. 4 is a perspective view of an exemplary embodiment of system 1000 as frame 1100 is engaged with vehicle component 1700 and begins to press vehicle part 1720 from vehicle component 1700.

Figure 5:
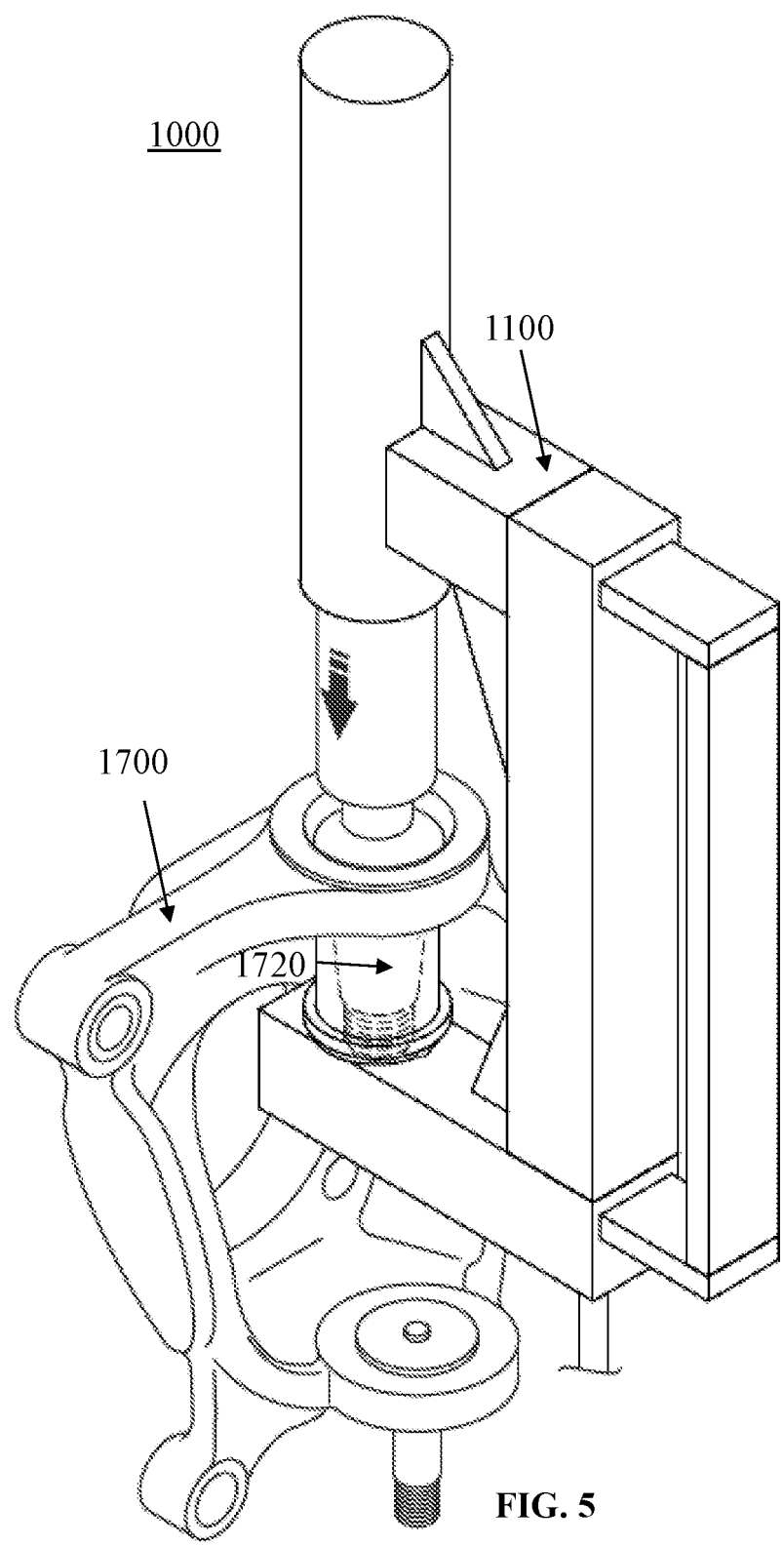
FIG. 5 is a perspective view of an exemplary embodiment of system 1000.

FIG. 5 is a perspective view of an exemplary embodiment of system 1000 as vehicle part 1720 is pressed from vehicle component 1700.

Figure 6:
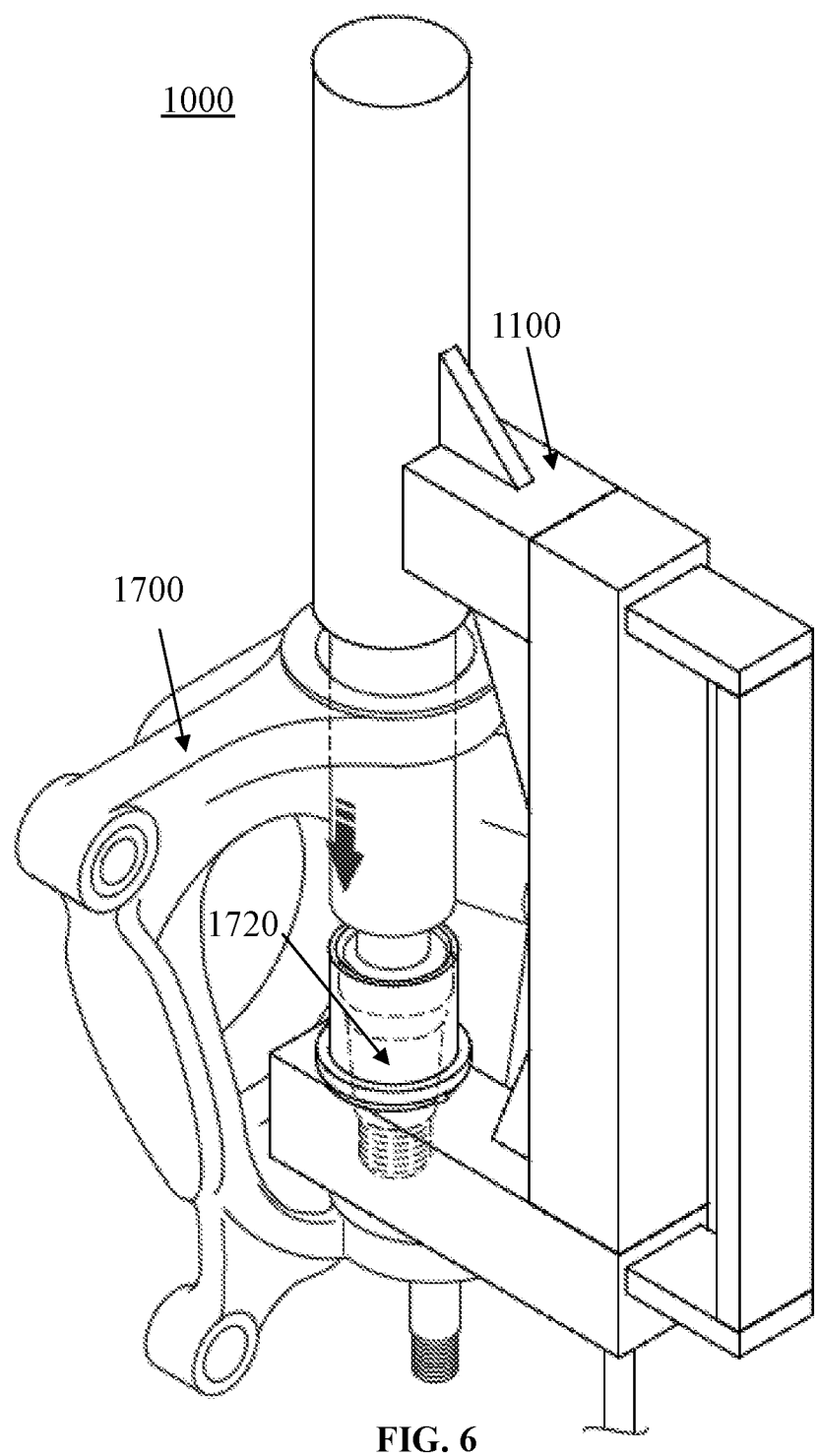
FIG. 6 is a perspective view of an exemplary embodiment of system 1000.

FIG. 6 is a perspective view of an exemplary embodiment of system 1000, which shows vehicle part 1720 pressed apart and separated from vehicle component 1700.

Figure 7:
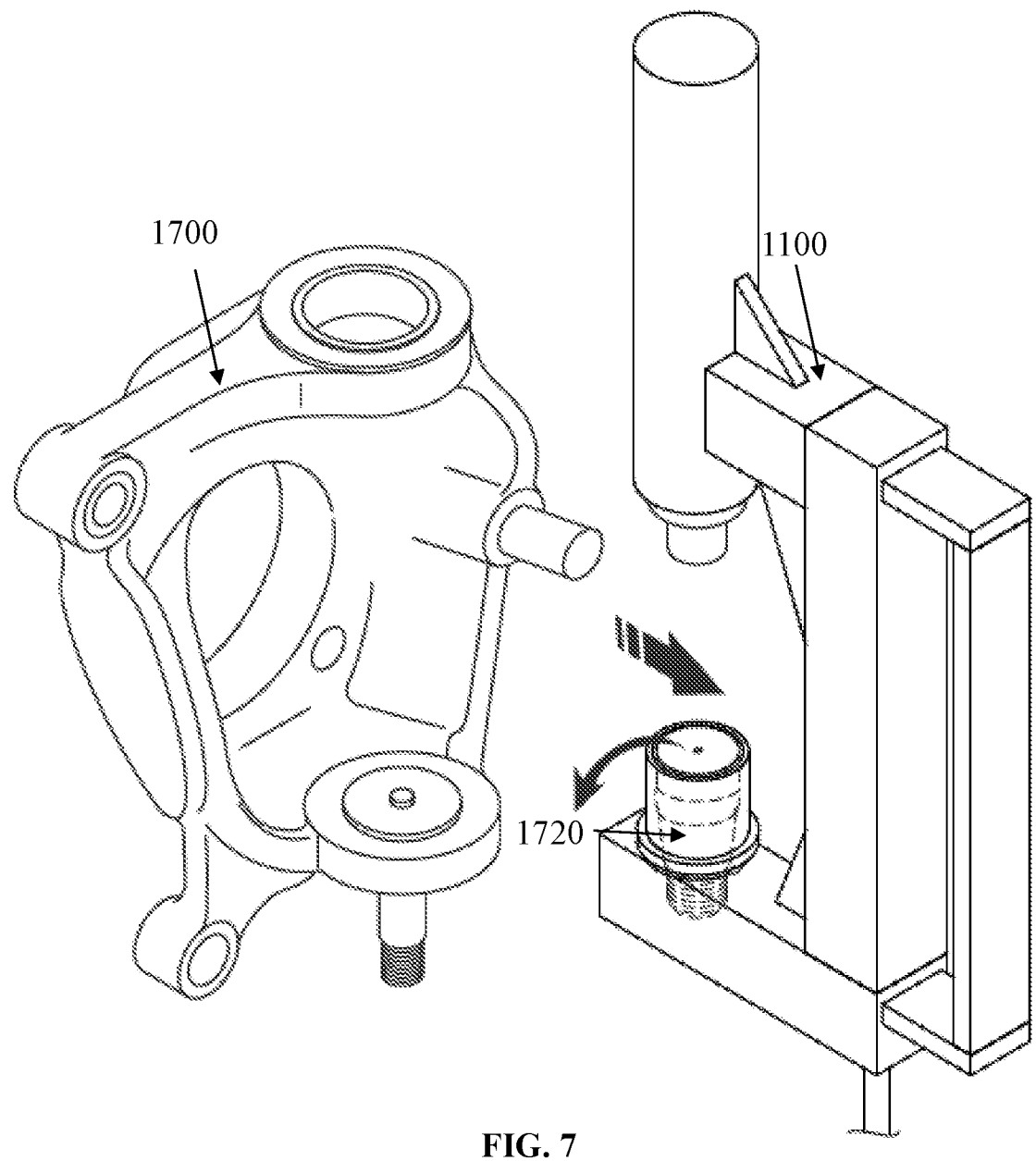
FIG. 7 is a perspective view of an exemplary embodiment of system 1000.

FIG. 7 is a perspective view of an exemplary embodiment of system 1000, which shows vehicle part 1720 pressed apart and separated from vehicle component 1700 and actuator 1400 retracted such that vehicle part 1720 can be removed from frame 1100. Installation of vehicle part 1720 is the reverse of the process depicted in FIGS. 1-7.

Figure 8:
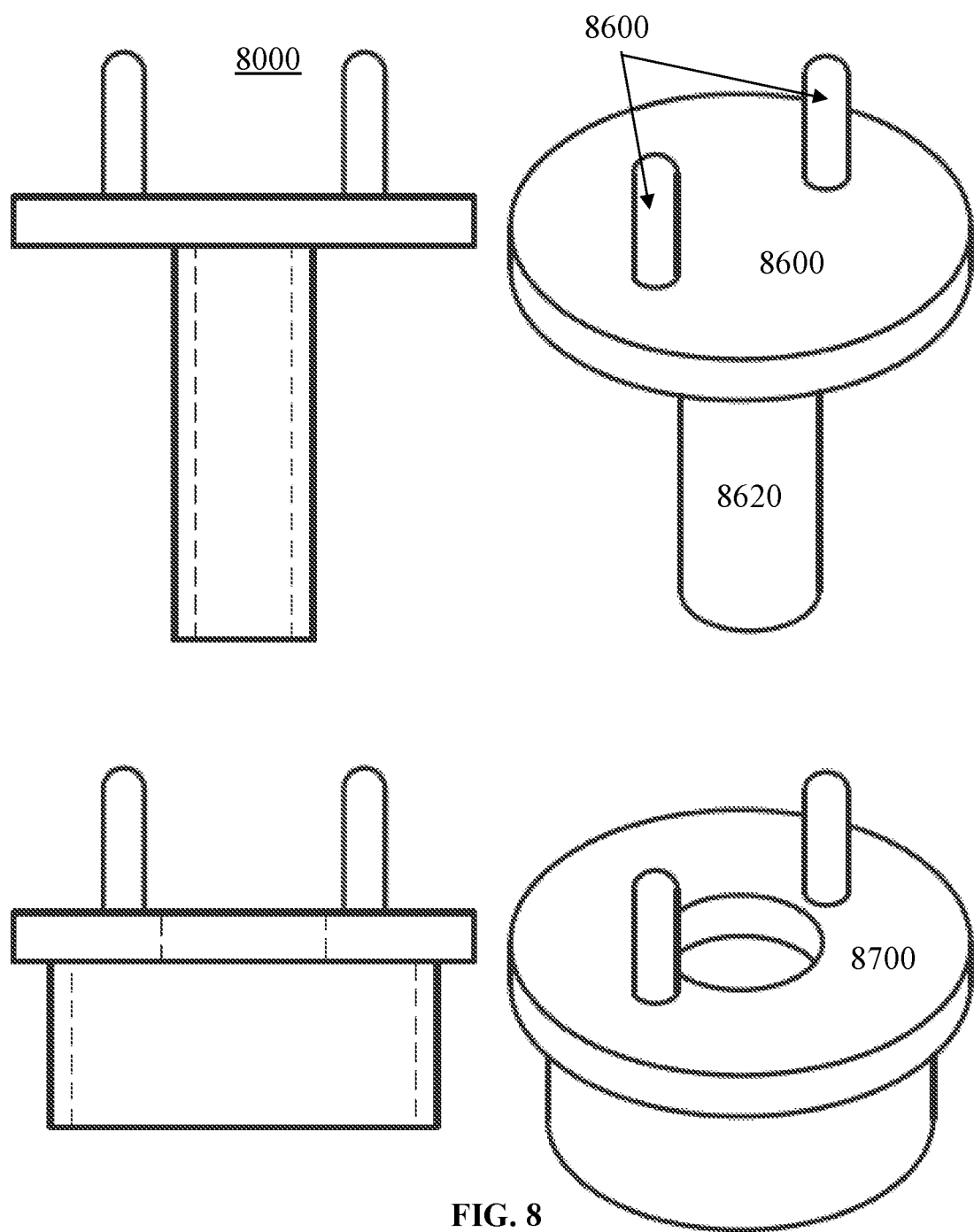
FIG. 8 is a side view and a perspective view of exemplary embodiments of two attachments 8000.

FIG. 8 is a side view and a perspective view of exemplary embodiments of two attachments 8000. Either attachment of two attachments 8000 is releasably coupleable to a base of a frame (e.g., base 1500 of frame 1100 of FIG. 1). Attachments 8600 and 8700 can be used to separate certain vehicle parts from vehicle components and/or couple certain vehicle parts to vehicle components.

Figure 9:
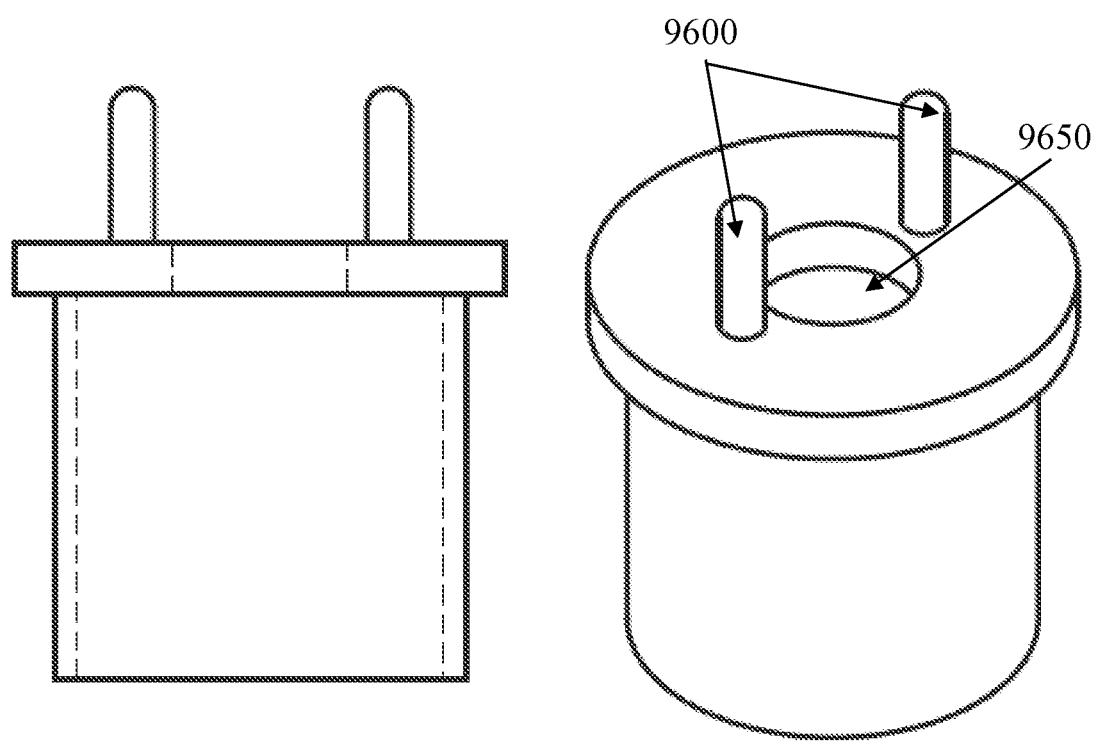
FIG. 9 is a side view and a perspective view of an exemplary embodiment of an attachment 9000.

FIG. 9 is a side view and a perspective view of an exemplary embodiment of an attachment 9000, which comprises a pair of prongs 9600 and defines a cavity 9650. Attachment 9000 can be used to separate certain vehicle parts from vehicle components and/or couple certain vehicle parts to vehicle components.

Figure 10:
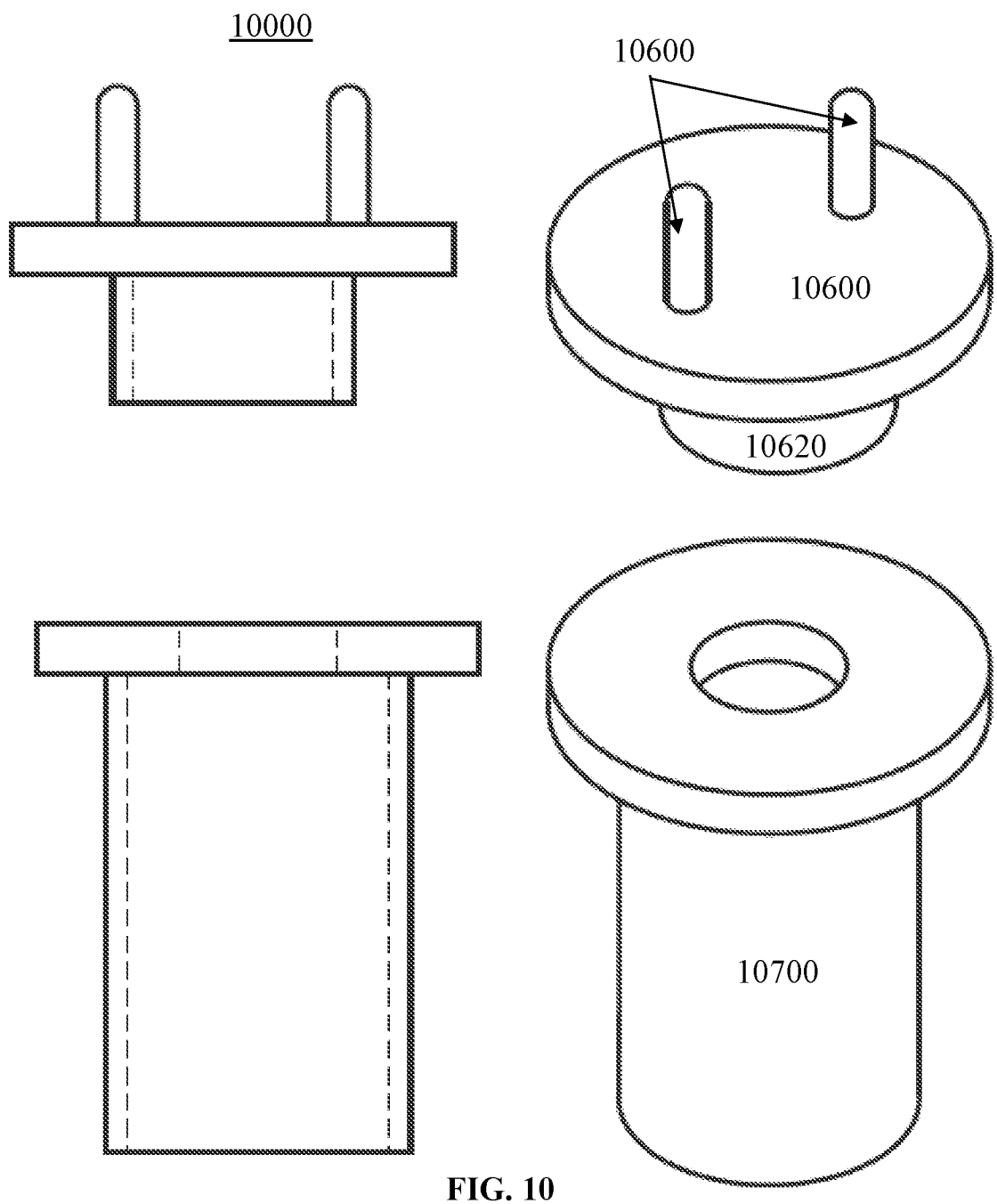
FIG. 10 is a side view and a perspective view of exemplary embodiments of two attachments 10000.

FIG. 10 is a side view and a perspective view of exemplary embodiments of two attachments 10000. Either attachment of two attachments 10000 is releasably coupleable to a base of a frame (e.g., base 1500 of frame 1100 of FIG. 1). Attachments 10600 and 10700 can be used to separate certain vehicle parts from vehicle components and/or couple certain vehicle parts to vehicle components.

Figure 11:
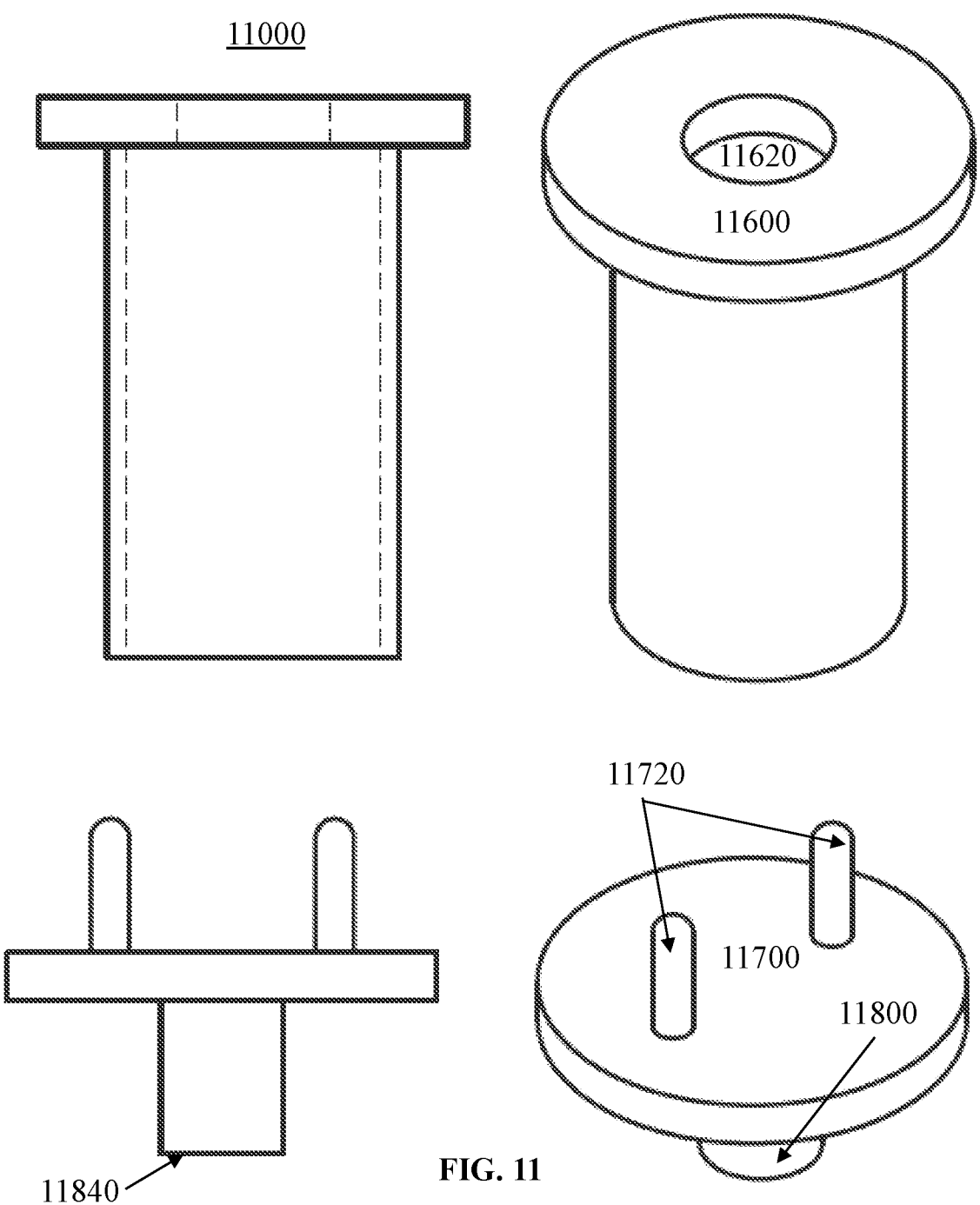
FIG. 11 is a side view and a perspective view of exemplary embodiments of a system 11000, which comprises an attachment and an adapter.

FIG. 11 is a side view and a perspective view of exemplary embodiments of a system 11000, which comprises an attachment and an adapter. Attachment 11700 comprises a cylinder 11800 and a pair of prongs 11720. Attachment 11700 can be used in conjunction with a partially hollow adapter 11600. When so used and coupled to the vehicle component, an upward pressure is applied to the vehicle part. Partially hollow adapter 11600 defines a cavity 11620. Attachment 11700 of comprises a cylinder 11800. When attachment 11700 is used in conjunction with a partially hollow adapter 11600, and when coupled to the vehicle component, an upward pressure is applied to the vehicle part. Attachment 11700 is releasably coupleable to a frame base. Attachment 11700 comprises a surface 11840 that allows the vehicle part to be pressed into the vehicle component.

Figure 12:
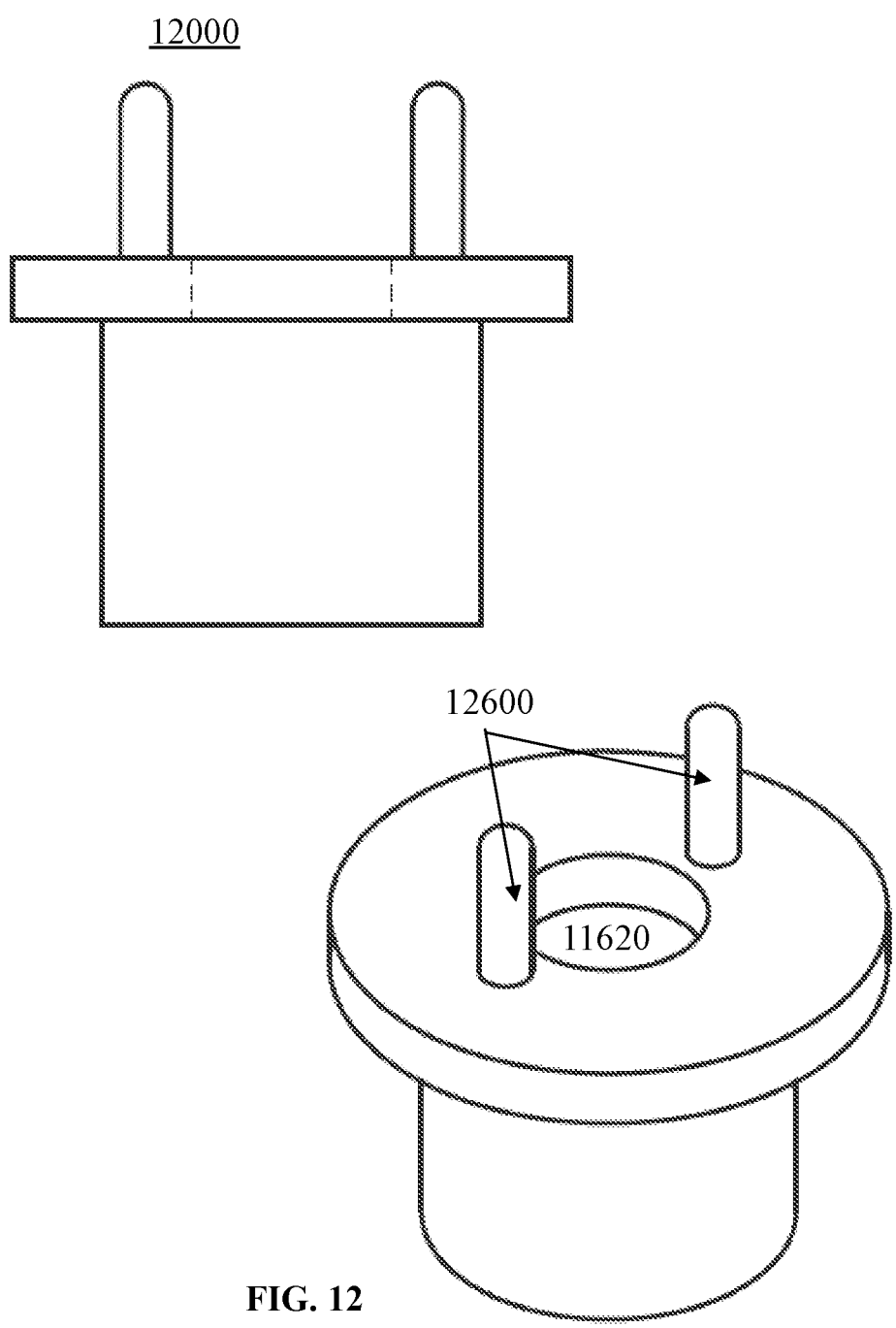
FIG. 12 is a side view and a perspective view of an exemplary embodiment of an attachment 12000.

FIG. 12 is a side view and a perspective view of an exemplary embodiment of an attachment 12000, which can be used to separate certain vehicle parts from vehicle components and/or couple certain vehicle parts to vehicle components. Attachment 12000 comprises a pair of prongs 12600 and defines a cavity 11620.

Figure 13:
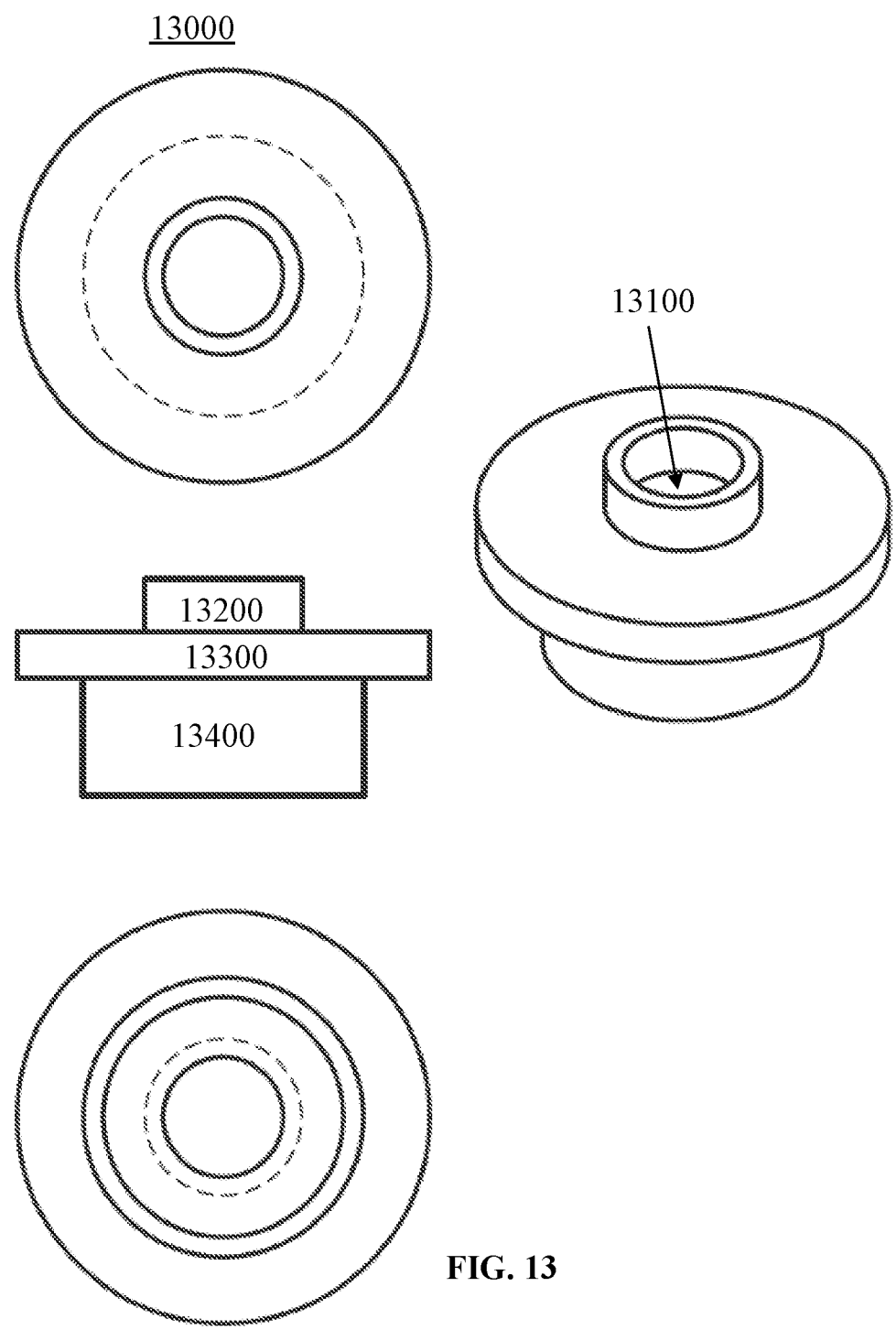
FIG. 13 shows four views of an exemplary embodiment of an adapter 13000.

FIG. 13 shows four views of an exemplary embodiment of an adapter 13000, which can be coupled to an actuator (e.g., actuator 1400 of FIG. 1). Adapter 13000 comprises a cap 13200, a body 13300, and a base 13400. Adapter 13000 defines a cavity 13100. Adapter 13000 can be used to separate certain vehicle parts from vehicle components and/or couple certain vehicle parts to vehicle components.

Figure 14:
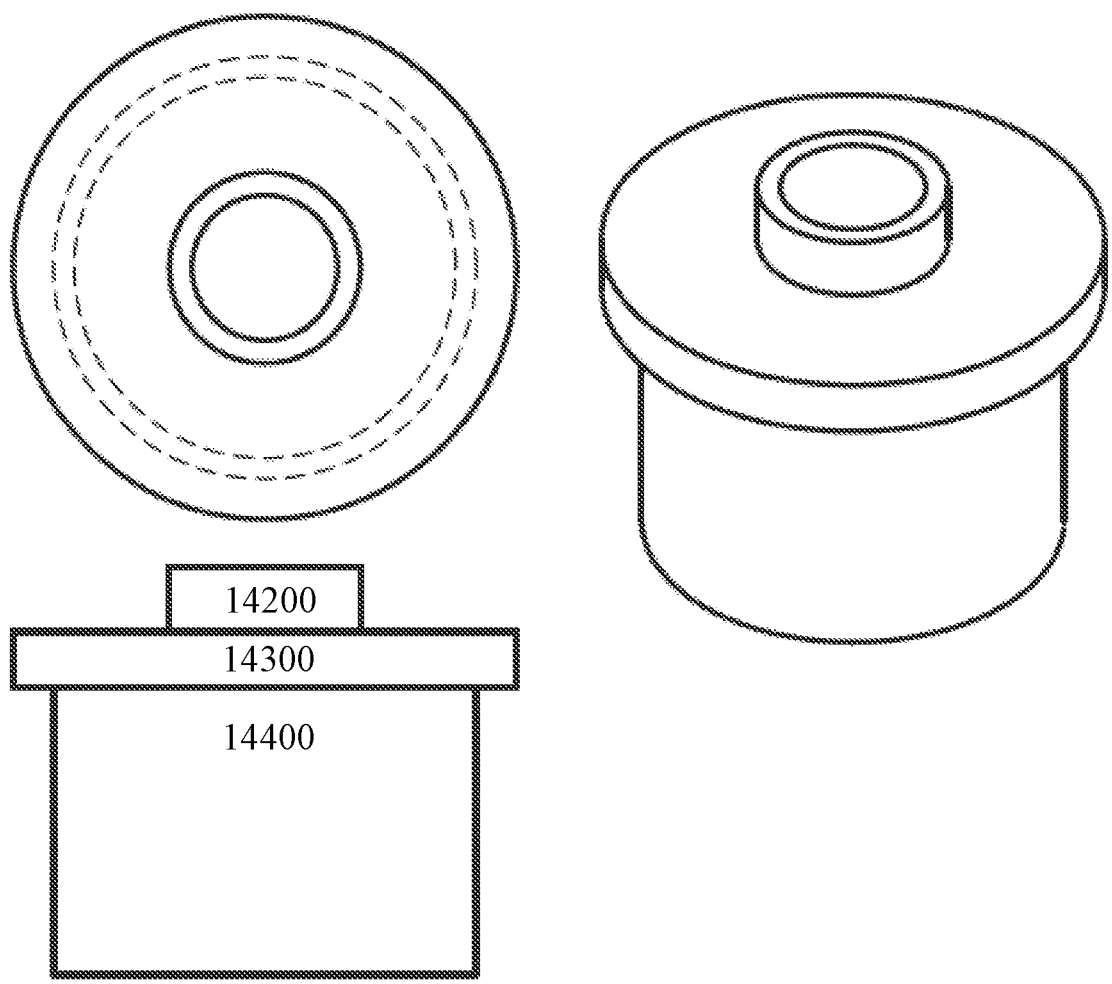
FIG. 14 shows three views of an exemplary embodiment of an adapter 14000.

FIG. 14 shows three views of an exemplary embodiment of an adapter 14000, which can be coupled to an actuator (e.g., actuator 1400 of FIG. 1). Adapter 14000 comprises a cap 14200, a body 14300, and a base 14400. Adapter 14000 can be used to separate certain vehicle parts from vehicle components and/or couple certain vehicle parts to vehicle components.

Figure 15:
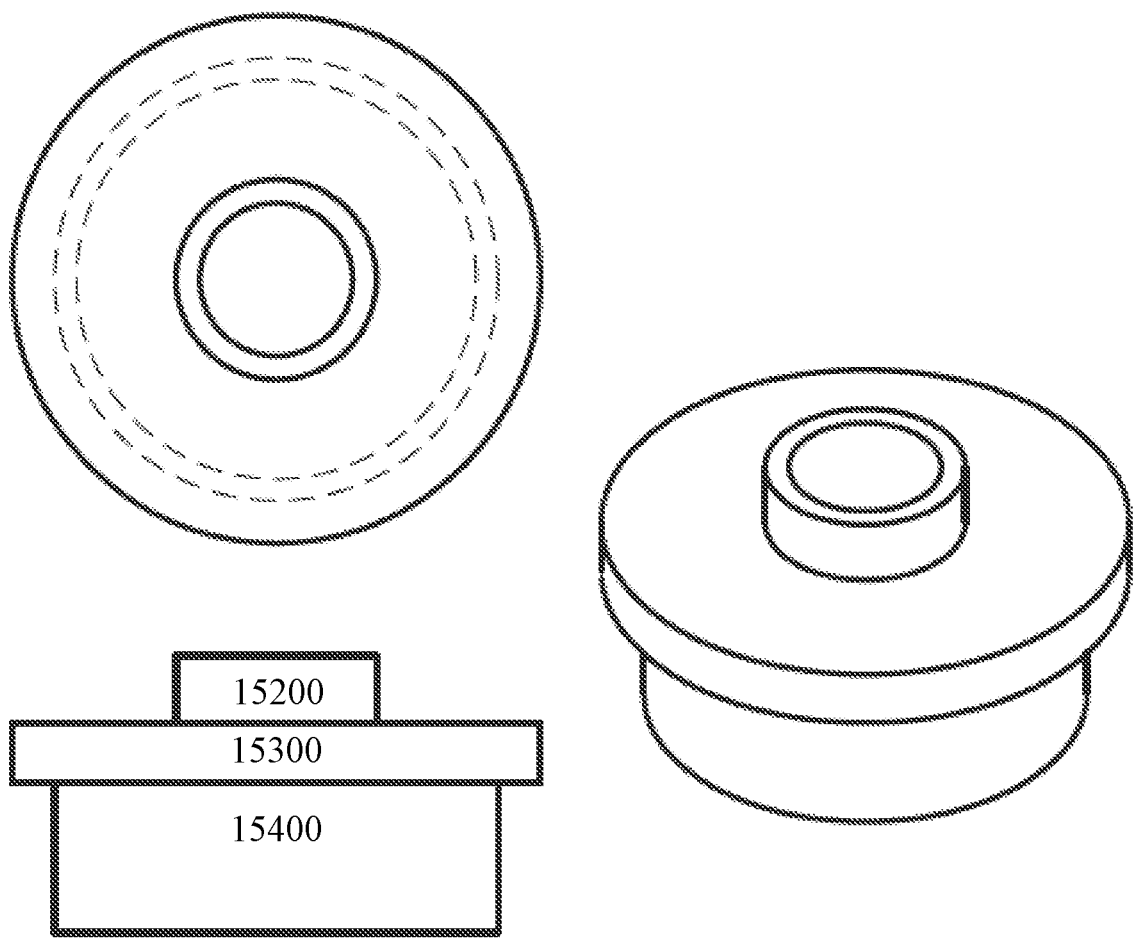
FIG. 15 shows three views of an exemplary embodiment of an adapter 15000.

FIG. 15 shows three views of an exemplary embodiment of an adapter 15000, which can be coupled to an actuator (e.g., actuator 1400 of FIG. 1). Adapter 15000 comprises a cap 15200, a body 15300, and a base 15400. Adapter 15000 can be used to separate certain vehicle parts from vehicle components and/or couple certain vehicle parts to vehicle components.

Figure 16:
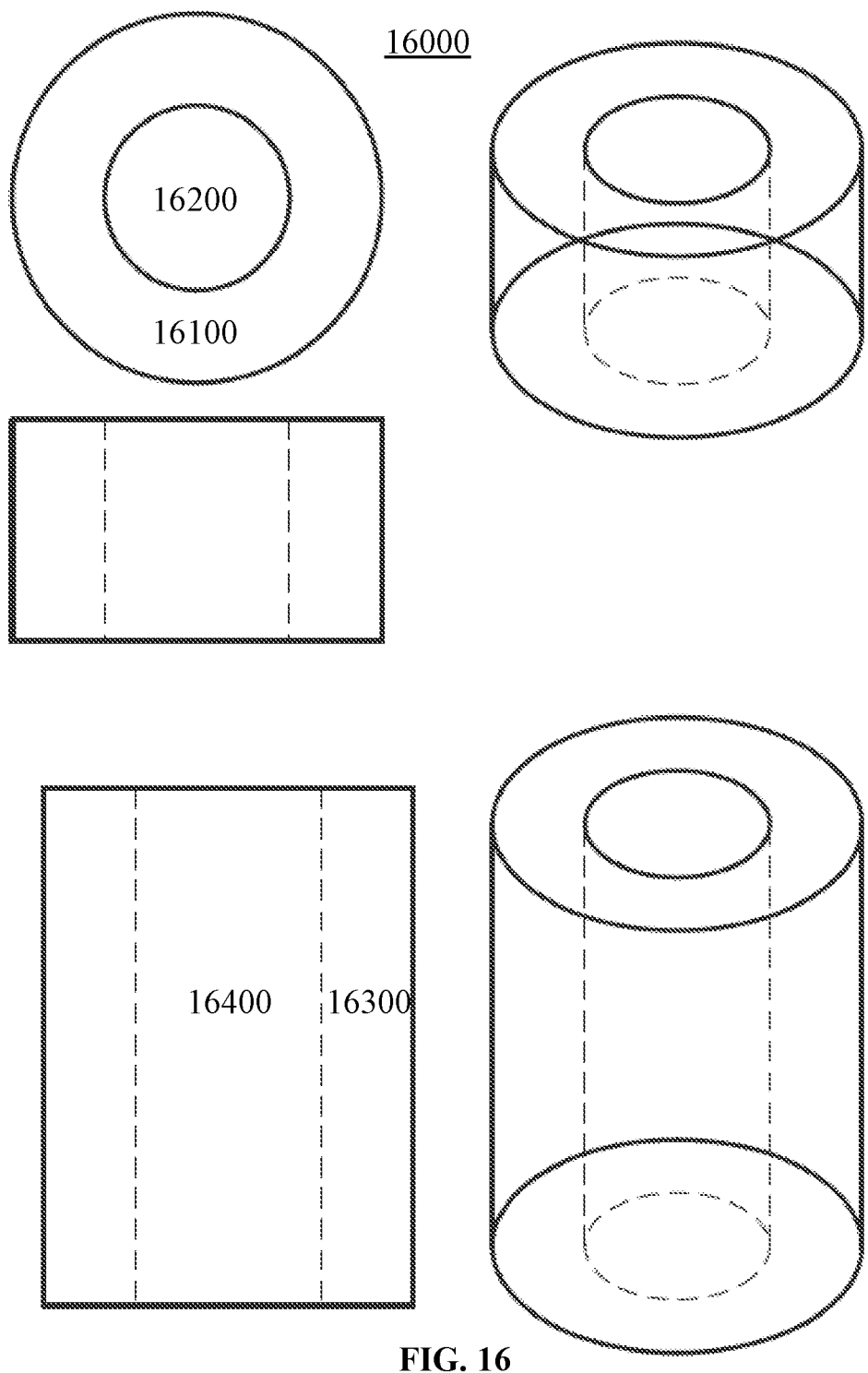
FIG. 16 shows views of a pair of adapters 16000.
Figure 17:
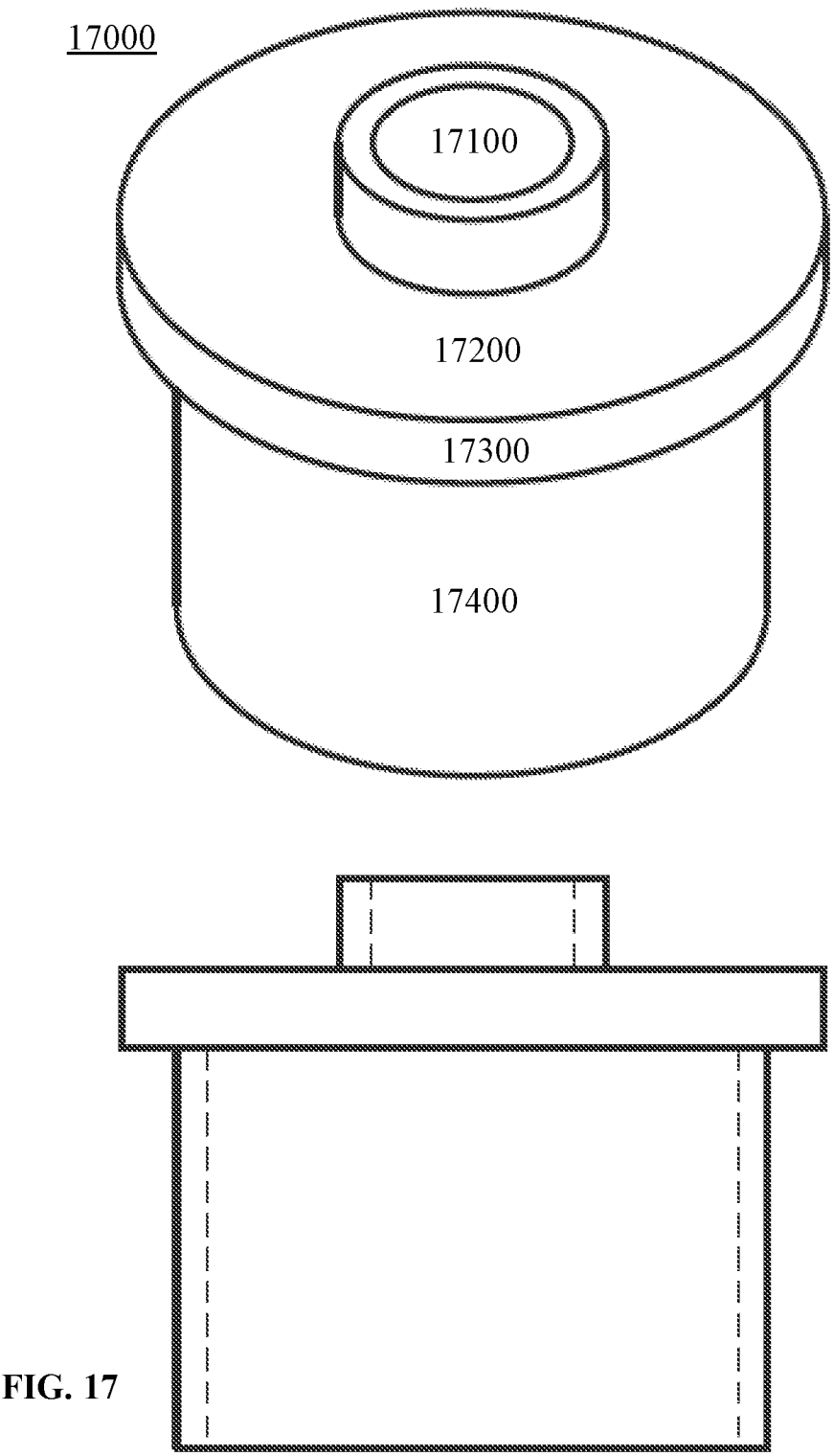
FIG. 17 is a side view and a perspective view of an exemplary embodiment of an adapter 17000.

FIG. 16 shows views of a pair of adapters 16000. First adapter 16100 defines a cavity 16200. Second adapter 16300 defines a cavity 16400. First adapter 16100 and/or second adapter 16300 can be used to separate certain vehicle parts from vehicle components and/or couple certain vehicle parts to vehicle components FIG. 17 is a side view and a perspective view of an exemplary embodiment of an adapter 17000, which defines a cavity 17100. Adapter 17000 comprises a cap 17200, a body 17300, and a base 17400. Adapter 17000 can be used to separate certain vehicle parts from vehicle components. Each adapter, when engaged with the system can cause an upward pressure be applied to the vehicle part as a shaft of the actuator travels in a downward direction.

Figure 18:
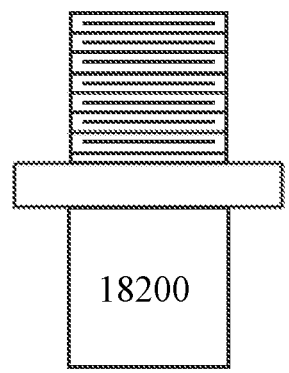
FIG. 18 is a side view and a perspective view of exemplary embodiments of three adapters 18000.
Figure 18:
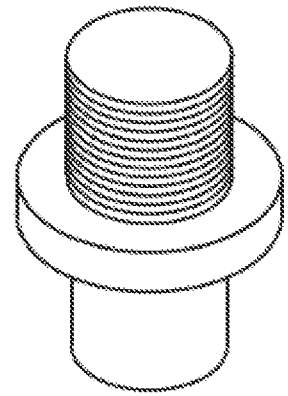
Figure 18:
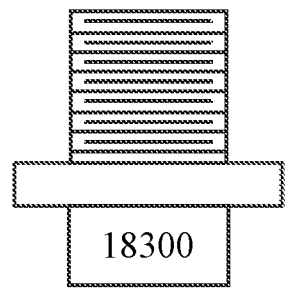
Figure 18:
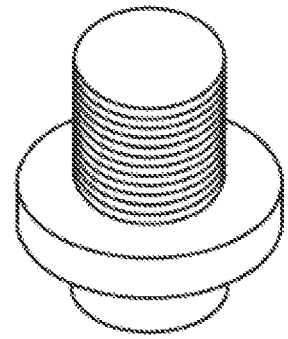
Figure 18:
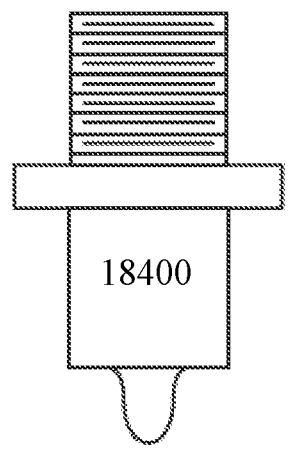
Figure 18:
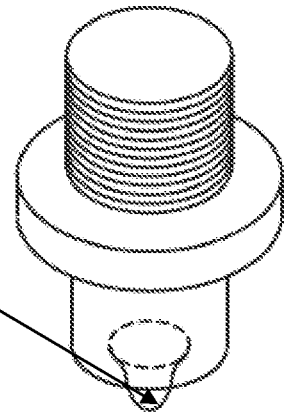

FIG. 18 is a side view and a perspective view of exemplary embodiments of three adapters 18000; a first adapter 18200, a second adapter 18300, and a third adapter 18400. Third adapter 18400 defines a nipple 18500.

Figure 19:
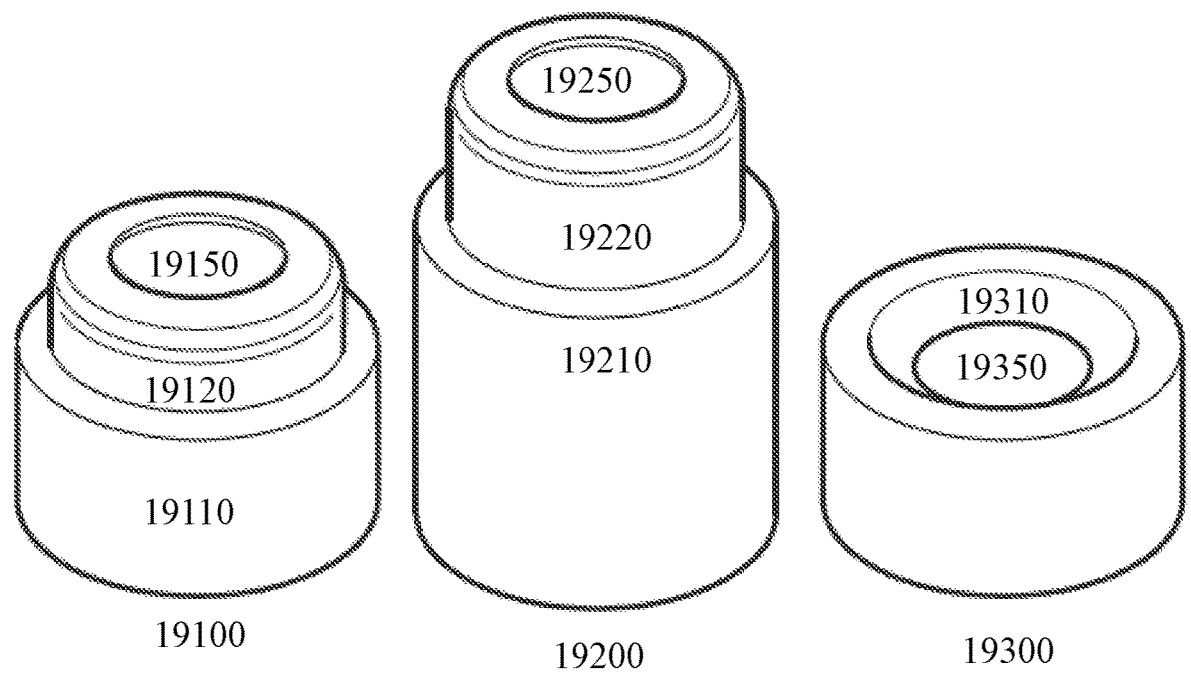
FIG. 19 is a perspective view of an exemplary embodiment of three attachments 19000.

FIG. 19 is a perspective view of an exemplary embodiment of three attachments 19000. First attachment 19100 comprises a base 19110 and a cap 19120 and defines a cavity 19150. Second attachment 19200 comprises a base 19210 and a cap 19220 and defines a cavity 19250. Third attachment 19300 comprises a beveled portion 19310 and defines a cavity 19350.

Definitions

When the following terms are used substantively herein, the accompanying definitions apply. These terms and definitions are presented without prejudice, and, consistent with the application, the right to redefine these terms during the prosecution of this application or any application claiming priority hereto is reserved. For the purpose of interpreting a claim of any patent that claims priority hereto, each definition (or redefined term if an original definition was amended during the prosecution of that patent), functions as a clear and unambiguous disavowal of the subject matter outside of that definition.

a—at least one.

activity—an action, act, step, and/or process or portion thereof.

actuator—a component of a system that has a shaft, wherein the shaft moves in and out of a cylinder.

adapter—a device used to effect operative compatibility between different parts of one or more pieces of an apparatus or system.

and/or—either in conjunction with or in alternative to.

adapter—a device that facilitates functioning of a system.

aperture—an opening.
apparatus—an appliance or device for a particular purpose.
apply—to make use of.
associate—to join, connect together, and/or relate.
attachment—a part that can be releasably coupled to a system.
backbone—a part of a system that provides primary structural support to the system.
ball joint—spherical bearings that connect control arms to steering knuckles of a vehicle.
base—a part comprising a surface, the part coupled to an opposing end of a frame from an actuator.
bearing—a machine element that constrains relative motion to only the desired motion, and reduces friction between moving parts.
bushing—an independent plain bearing that is inserted into a housing to provide a bearing surface for rotary applications; this is the most common form of a plain bearing.
can—is capable of, in at least some embodiments.
cause—to produce an effect.
comprising—including but not limited to.
configure—to make suitable or fit for a specific use or situation.
conjunction—together with something.
connect—to join or fasten together.
constructed to—made to and/or designed to.
corresponding—matching something else.
coupleable—capable of being joined, connected, and/or linked together.
coupling—linking in some fashion.
cylinder—a solid bounded by two substantially parallel planes and generated by a straight line moving parallel to the given planes and tracing a curve bounded by the planes and lying in a plane perpendicular or oblique to the given planes.
define—to establish the outline, form, or structure of.
determine—to obtain, calculate, decide, deduce, and/or ascertain.
device—a machine, manufacture, and/or collection thereof.
direction—a line along which something moves.
downward—toward the earth's surface.
engage—to interlock with something.
facilitate—to assist.
fixedly—coupled in a manner that does not allow nondestructive uncoupling.
frame—a structure that supports something.
handle—a part used by a human to hold or operate something.
hollow—defining a cavity.
hydraulic cylinder—a mechanical actuator that is used to give a unidirectional force through a unidirectional stroke of a shaft.
install—to connect or set in position and prepare for use.
lift—to move something upward relative to the earth's surface.
longitudinal axis—a line along a longest dimension of an object that passes through the object's center of gravity
may—is allowed and/or permitted to, in at least some embodiments.
method—a process, procedure, and/or collection of related activities for accomplishing something.
parallel—always being approximately the same distance apart.
partially—not entirely.
plurality—the state of being plural and/or more than one.
position—to place something in a particular location.
predetermined—established in advance.
press—to install via pressure.
press fit—an interference fit between two parts in which one is forced under pressure into a slightly smaller hole in the other.
pressure—a force that pushes.
prong—a projecting part.
provide—to furnish, supply, give, and/or make available.
receive—to get, take, acquire, and/or obtain.
releasably—capable of being substantially nondestructively removed.
remove—to physically separate.
repeatedly—again and again; repetitively.
seize—to become stuck or jammed together.
select—to make a choice or selection from alternatives.
set—a related plurality.
shaft—a rod that moves in and out of a cylinder of an actuator.
substantially—to a great extent or degree.
support—to bear the weight of, especially from below.
surface—an outer face of something.
system—a collection of mechanisms, devices, machines, articles of manufacture, processes, data, and/or instructions, the collection designed to perform one or more specific functions.
universal joint—a coupling in a rigid rod that allows the rod to "bend" in any direction, and is commonly used in shafts that transmit rotary motion.
upward—away from the earth's surface.
user—a person that operates a system.
vehicle—a conveyance moving on wheels, runners, tracks, or the like, as a cart, sled, automobile, truck, pickup truck, jeep, sport utility vehicle, or tractor, etc.
vehicle component—a subsystem of a vehicle that comprises a releasably coupled vehicle part.
vehicle part—a replaceable portion of a vehicle component.
via—by way of and/or utilizing.

Note

Still other substantially and specifically practical and useful embodiments will become readily apparent to those skilled in this art from reading the above-recited and/or herein-included detailed description and/or drawings of certain exemplary embodiments. It should be understood that numerous variations, modifications, and additional embodiments are possible, and accordingly, all such variations, modifications, and embodiments are to be regarded as being within the scope of this application.

Thus, regardless of the content of any portion (e.g., title, field, background, summary, description, abstract, drawing figure, etc.) of this application, unless clearly specified to the contrary, such as via explicit definition, assertion, or argument, with respect to any claim, whether of this application and/or any claim of any application claiming priority hereto, and whether originally presented or otherwise:
there is no requirement for the inclusion of any particular described or illustrated characteristic, function, activity, or element, any particular sequence of activities, or any particular interrelationship of elements;
no characteristic, function, activity, or element is "essential";
any elements can be integrated, segregated, and/or duplicated;

any activity can be repeated, any activity can be performed by multiple entities, and/or any activity can be performed in multiple jurisdictions; and any activity or element can be specifically excluded, the sequence of activities can vary, and/or the interrelationship of elements can vary.

Moreover, when any number or range is described herein, unless clearly stated otherwise, that number or range is approximate. When any range is described herein, unless clearly stated otherwise, that range includes all values therein and all subranges therein. For example, if a range of 1 to 10 is described, that range includes all values therebetween, such as for example, 1.1, 2.5, 3.335, 5, 6.179, 8.9999, etc., and includes all subranges therebetween, such as for example, 1 to 3.65, 2.8 to 8.14, 1.93 to 9, etc.

When any claim element is followed by a drawing element number, that drawing element number is exemplary and non-limiting on claim scope. No claim of this application is intended to invoke paragraph six of 35 USC 112 unless the precise phrase "means for" is followed by a gerund.

Any information in any material (e.g., a United States patent, United States patent application, book, article, etc.) that has been incorporated by reference herein, is only incorporated by reference to the extent that no conflict exists between such information and the other statements and drawings set forth herein. In the event of such conflict, including a conflict that would render invalid any claim herein or seeking priority hereto, then any such conflicting information in such material is specifically not incorporated by reference herein.

Accordingly, every portion (e.g., title, field, background, summary, description, abstract, drawing figure, etc.) of this application, other than the claims themselves, is to be regarded as illustrative in nature, and not as restrictive, and the scope of subject matter protected by any patent that issues based on this application is defined only by the claims of that patent.

What is claimed is:

1. A system comprising:
a frame that comprises:
a backbone, the backbone defining a backbone longitudinal axis;
a handle coupled to the backbone, the handle having a handle longitudinal axis that is substantially parallel to the backbone longitudinal axis, the handle positioned to allow a user to lift and position the frame;
an actuator coupled to the backbone, the actuator defining an actuator longitudinal axis, the actuator longitudinal axis substantially parallel to the backbone longitudinal axis;
a base coupled to the backbone, the base defining a plurality of attachment apertures, the base defining a single vehicle part aperture, the single vehicle part aperture having a substantially circular cross section, the base having a block shape with a first rectangular cross section along a longitudinal axis of the base and a second rectangular cross section along a latitudinal axis of the base that is perpendicular to the longitudinal axis of the base;
wherein the frame is positionable on a vehicle component such that a portion of the vehicle component is positioned between the actuator and the base, the actuator constructed to apply pressure to the vehicle component to remove or install a vehicle part, wherein a portion of the vehicle part is received by the single vehicle part aperture when the vehicle component is engaged with the frame;
and an attachment releasably coupleable to the base, the attachment comprising a plurality of prongs, each of the plurality of prongs spaced to engage with a corresponding aperture of a plurality of attachment apertures defined by the base, wherein the attachment provides an aperture or surface that facilitates application of pressure to the vehicle part.

2. The system of claim 1, wherein:
the backbone is a hollow member.

3. The system of claim 1, wherein:
the backbone is fixedly coupled to the handle.

4. The system of claim 1, wherein:
the actuator is a hydraulic cylinder.

5. The system of claim 1, wherein:
the actuator is mounted above the vehicle part and applies downward pressure to the vehicle part.

6. The system of claim 1, wherein:
the vehicle component comprises a ball joint and the actuator presses the ball joint loose from the vehicle component.

7. The system of claim 1, wherein:
the vehicle component comprises a ball joint and the actuator presses the ball joint into the vehicle component.

8. The system of claim 1, wherein:
a portion of the vehicle part is received by the vehicle part aperture.

9. The system of claim 1, wherein:
the vehicle part is a bushing.

10. The system of claim 1, wherein:
the vehicle part comprises a bearing.

11. The system of claim 1, wherein:
the vehicle component comprises a universal joint and the actuator presses a portion of the universal joint.

12. A system comprising:
a frame that comprises:
a backbone, the backbone defining a backbone longitudinal axis;
a handle coupled to the backbone, the handle having a handle longitudinal axis that is substantially parallel to the backbone longitudinal axis, the handle positioned to allow a user to lift and position the frame;
an actuator coupled to the backbone, the actuator defining an actuator longitudinal axis, the actuator longitudinal axis substantially parallel to the backbone longitudinal axis;
a base coupled to the backbone, the base defining a plurality of attachment apertures, the base defining a single vehicle part aperture, the single vehicle part aperture having a substantially circular cross section, the base having a block shape with a first rectangular cross section along a longitudinal axis of the base and a second rectangular cross section along a latitudinal axis of the base that is perpendicular to the longitudinal axis of the base;
wherein the frame is positionable on a vehicle component such that a portion of the vehicle component is positioned between the actuator and the base, the actuator constructed to apply pressure to the vehicle component to remove or install a vehicle part, wherein a portion of the vehicle part is received by the single vehicle part aperture when the vehicle component is engaged with the frame; and
an attachment releasably coupleable to the base, the attachment comprising a male cylinder that extends from the attachment and a pair of prongs, the attachment used in conjunction with a partially hollow adapter that, when coupled to the vehicle component causes an upward pressure be applied to the vehicle part.

13. A system comprising:
a frame that comprises:
- a backbone, the backbone defining a backbone longitudinal axis;
- a handle coupled to the backbone, the handle having a handle longitudinal axis that is substantially parallel to the backbone longitudinal axis, the handle positioned to allow a user to lift and position the frame;
- an actuator coupled to the backbone, the actuator defining an actuator longitudinal axis, the actuator longitudinal axis substantially parallel to the backbone longitudinal axis;
- a base coupled to the backbone, the base defining a plurality of attachment apertures, the base defining a single vehicle part aperture, the single vehicle part aperture having a substantially circular cross section, the base having a block shape with a first rectangular cross section along a longitudinal axis of the base and a second rectangular cross section along a latitudinal axis of the base that is perpendicular to the longitudinal axis of the base;

wherein the frame is positionable on a vehicle component such that a portion of the vehicle component is positioned between the actuator and the base, the actuator constructed to apply pressure to the vehicle component to remove or install a vehicle part, wherein a portion of the vehicle part is received by the single vehicle part aperture when the vehicle component is engaged with the frame; and an attachment releasably coupleable to the base, the attachment defining an attachment aperture, the attachment used in conjunction with an adapter that, when engaged with the system causes an upward pressure be applied to the vehicle part as a shaft of the actuator travels in a downward direction.

* * * * *